Nov. 30, 1937.　　G. M. DEMING　　2,100,384
OXYGEN CUTTING APPARATUS
Filed Sept. 29, 1932
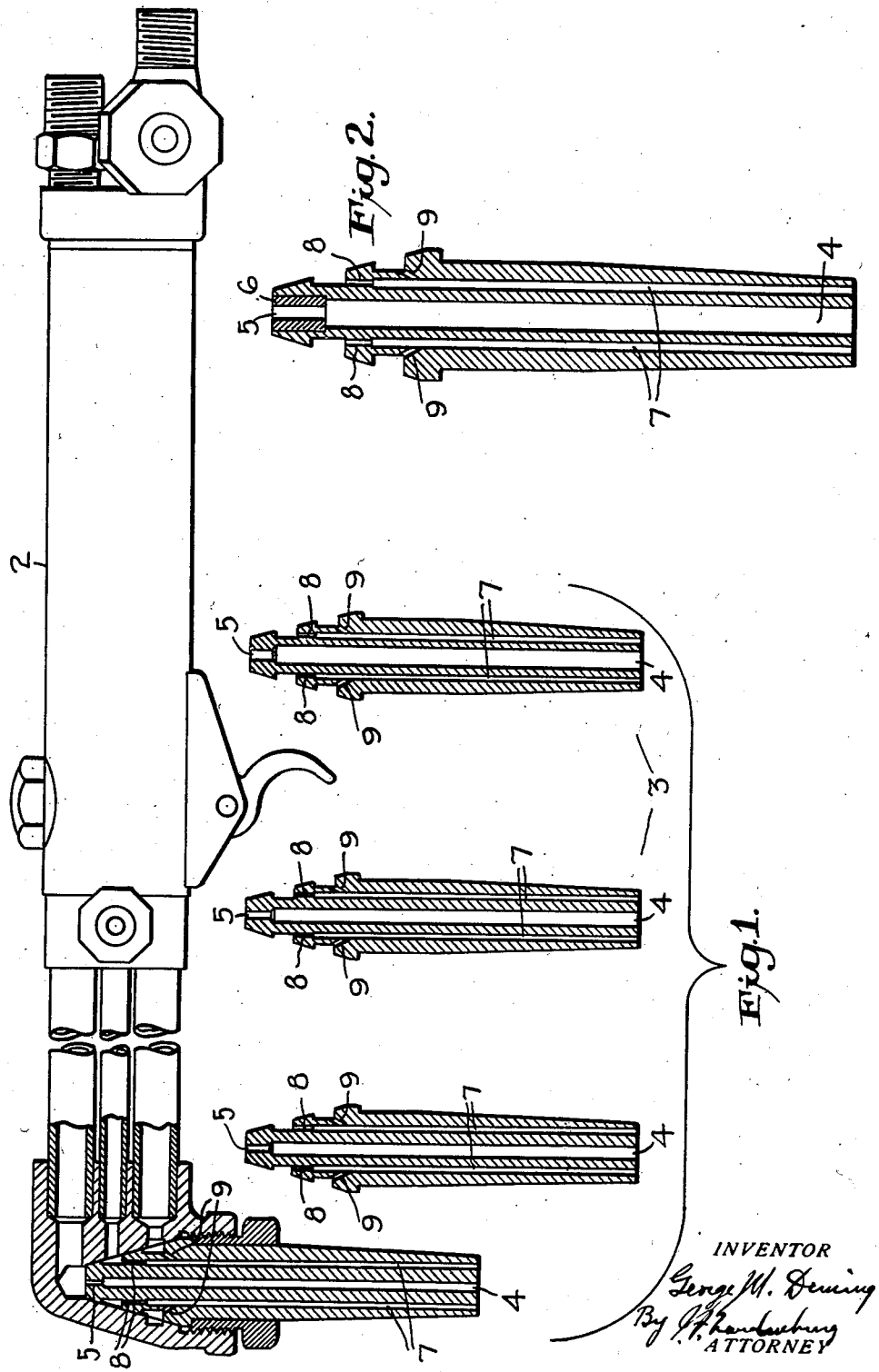

Patented Nov. 30, 1937

2,100,384

UNITED STATES PATENT OFFICE 2,100,384

OXYGEN CUTTING APPARATUS

George M. Deming, East Orange, N. J., assignor to Air Reduction Company, Incorporated, New York, N. Y., a corporation of New York Application September 29, 1932, Serial No. 635,342

1 Claim. (Cl. 158—27.4)

This invention relates to the art of cutting metal by an oxygen jet, and to the torches, and more especially the cutting tips, for performing this work.

It has long been the universal practice to use tips of different powers interchangeable in the head of a cutting torch. Each of these tips contains a delivery port for delivering the stream of cutting oxygen. The higher powers of tips contain larger delivery ports. Although the higher powers of tips will cut both the lighter thicknesses of metal and the heavier thicknesses, the lower powers of tips are more efficient in cutting the lighter thicknesses in that they consume less oxygen. However, for cutting a given limiting thickness of metal, there has been found to be a certain minimum diameter of bore for delivering the cutting oxygen stream below which it is difficult, if not impossible, to propagate the cutting operation. Thus, from considerations both of economy and of satisfactory working conditions, there has been found to be a fairly definite diameter of delivery port for cutting any given thickness of metal. But neither the economy of oxygen consumption nor satisfactory cutting conditions may be realized unless a suitable operating pressure is employed for delivering the oxygen to the torch and tip. In general, this pressure increases with the power of the tips, (that is, with the diameter of the oxygen delivery port). This pressure varies somewhat according to the type or quality of metal which must be cut, but, as an example of common practice, a number one tip, having an oxygen orifice about .047" in diameter, to be used for cutting thicknesses up to one inch, would require an operating pressure of 30 pounds, a number two tip, having an oxygen orifice about .060" in diameter, for cutting thicknesses from one to two inches, would require 50 pounds pressure, a number three tip, having an oxygen orifice about .070" in diameter, to cut up to three inches in thickness, should be operated at 70 pounds pressure, a number four tip, with an oxygen orifice about .086" in diameter, having an effective cutting power up to six inches thickness, would be rated for 80 pounds of cutting oxygen pressure, and so on.

Notwithstanding that tables of operating pressures are usually supplied with the torch, they are not always available when wanted. Because of this and the inconvenience of referring to them, the average operator is more than likely to rely on his own ideas, and the use of excessive, wasteful and generally unsuitable pressures has been common. Besides loss of time and excessive consumption of oxygen, many cuts are ruined or made imperfectly because of guesswork, poor judgment, and cut and try methods.

The object of this invention is to make it possible to operate all tips of a set with the same basic pressure at the oxygen regulator, instead of observing pressures scattered through a wide range as in present practice, and yet to obtain the most satisfactory rate of cutting oxygen discharge for each tip employed. The purpose is not merely to eliminate the pressure variable, and thus to save the user's time and oxygen and simplify his cutting operations, but also to insure quality of cutting, that is to say, a severance in which the kerf is of minimum width consistent with the thickness of the metal and has smooth and vertical wall faces.

Ordinary cutting tips have delivery orifices for the cutting oxygen which are straight, parallel-walled bores of the selected sizes, the length of these orifices being frequently made shorter than the lengths of the tips by an enlarged counter-boring extending a suitable distance from the rear end of the tip.

As the result of much study and investigation, I have found that cutting tips of different sizes or powers can be made, each of which will operate on the same oxygen pressure and do very excellent and economical cutting. This involves the use of restricted inlet orifices through which the cutting oxygen must pass to the exit orifices, and a relationship between the inlet and exit orifices. In a set of tips made in accordance with the invention, as one progresses from the smaller to the larger exit orifices, the degree of restriction in the other end of the tip must gradually become less relatively to the cross-section of the exit orifice. In other words, it is characteristic of a set of tips of the invention that the ratio of the cross-sectional area of the cutting oxygen inlet orifice to the cross-sectional area of the cutting oxygen outlet orifice increases from tip to tip in the ascending scale of exit orifice sizes. On this basis, a set of tips can be designed empirically by forming exit orifices of standard sizes for a range of lighter to heavier cutting, and by drilling or otherwise providing restrictions in, or opening into, these oxygen passages. After measuring the most economical rate of oxygen flow for each duty, a suitable graduation of sizes of the inlet orifices can be established by experiment to give the proper flows, or approximately those flows, at a constant supply pressure. It will be understood that it is not necessary to adhere to the exit orifice sizes of any standard set of tips, though the sizes should vary appropriately as between the different tip powers, in the sense that a tip for heavier cutting has an oxygen jet delivery orifice larger than a tip for lighter cutting.

I have further ascertained formulae by which the tips can be manufactured without resort to empirical methods such as indicated. A constant or fixed gauge pressure of 100 pounds is a desirable value. For that pressure the formula is:

$$A_r = (21 \pm 6) A_c^{1.66}$$

In this formula $A_r$ is the cross-sectional area of the oxygen inlet orifice in square inches, and $A_c$ is the cross-sectional area of the exit orifice in square inches. The term $\pm 6$ is in part an allowance for manufacturing tolerances. However, it also includes a necessary allowance for some degree of individual judgment on the part of the designer, inasmuch as the correct operating conditions for a tip is not a matter which can be established with mathematical certainty.

In contemplation of fixed operating pressures other than 100 pounds, a more general formula is:

$$A_r = \left(\left(\frac{4000 \pm 700}{P}\right) - 14\right) A_c^{1.66}$$

$A_r$ and $A_c$ having the same significance as before and $P$ being the absolute value of the intended operating pressure in pounds per square inch.

These formulae assume torches, or torch bodies, in which, as in usual good practice, the passages for passing cutting oxygen through the torch up to the tip are of ample area, so that the pressure drop between the regulator and the tip is small compared with the pressure drop through the tip. The formulae also assume oxygen hose of the quarter-inch size and approximately twenty-five feet long connecting the torch with the regulator, and standard hose nipples of $\frac{3}{16}$ inch bore. If a special torch should materially restrict or resist the oxygen flow before it reached the inlet orifice of the cutting passage of the tip, or if much larger or longer hose were used, the formulae would not be strictly correct, but unless the departure from these ordinary conditions were unreasonably great a cutting system designed within the implied tolerances of one or the other formula would still perform to reasonable satisfaction. For some torches, for best results it may be better to resort to the trial of different inlet orifice sizes to secure suitable rates of discharge at constant pressure, and in any case that procedure may be resorted to.

In the accompanying drawing:

Fig. 1 is an elevation of a cutting torch and a set of the tips to be used with it, the tips, one of which is applied to the torch, being in section, the head of the torch also being in section, and a portion of the torch being broken out to reduce the length of the view; and Fig. 2 is a longitudinal section of a tip on a larger scale, showing that the restriction orifice may be provided by means of an insert piece, a portion of this insert piece and of the rear end of the tip being broken away and sectioned.

Fig. 1 shows a cutting torch or torch body 2, and a set of tips 3, any one of which can be seated in the torch. Four tips are shown for purpose of illustration, but needless to say, the number of tips in a set may vary. The orifice 4 that conducts the oxygen stream and forms and delivers the cutting jet is preferably a straight bore extending the major part of the length of the tip and opening through the front end of the tip. However, the form and length of this orifice may be varied. At the rear or entrance end of the orifice 4, and preferably at the rear end of the tip, though the precise location is not essential, there is a restricted and preferably short inlet orifice 5. This orifice may be made by drilling in from the rear end of the tip, or an insert thimble 6, in which the inlet orifice 5 is made, may be set into a rear end enlargement of the bore 4. This latter construction may be used for converting standard cutting tips, requiring a wide range of oxygen gauge pressures, into the constant pressure tips of this invention. Such insert pieces also make it easy and inexpensive to determine exact sizes for the cutting oxygen inlet orifices by a certain amount of cut and try procedure.

The tips may have any usual or suitable preheating provisions. Preheating passages 7 having ports 8 and 9 for admission of oxygen and fuel gas are shown.

It has not been attempted to draw the tips to scale. Fig. 1 is to be understood as being illustrative of a set of tips of different "sizes", in which there are restricted inlet orifices for the cutting oxygen, in which the exit orifices are of smaller and larger sizes, and in which the degree of restriction at the rear end is less in relation to the cross-sectional areas of the exit orifice as the exit orifices increase in size.

With an equipment of tips having orifices as disclosed herein the operator is freed from guess-work and trying to remember different pressures to be used with different tips. Tables of operating pressures are eliminated, and for the most part adjustment of the oxygen regulator is unnecessary. The foreman can tell by a glance at the pressure gauge whether the operator has set an excessive pressure and is, consequently, using too much oxygen. Indeed, a reducing valve (i. e., a constant pressure regulator) as a rule may be used at the oxygen cylinder instead of the standard regulator. Gaugeless regulators, regulators without the low-pressure gauge and without adjusting screws, or regulators with locking devices can be employed to advantage.

With the correct fixed-pressure tip applied to the torch, it is necessary for the operator only to choose the right tip, insert it, and go to work without further thought, simply adjusting the speed of movement of the torch along the line of severance to complete the cut in the minimum time consistent with a satisfactory quality of cut.

Naturally, it is not essential that absolutely the same pressure be used at all times for all tips. Thus, for a tip having a substantial cutting range in thickness of metal it may be considered advisable to use less oxygen for the lighter thickness than for the heavier thickness. The necessary difference is not great because in practice some adjustment of cutting speed may readily be made to compensate for differences in outflow requirements. However, it is entirely conceivable that some meticulous operators will desire to use a somewhat lower operating pressure when, for example, they are cutting eight inch material and are using a tip which is normally suitable for cutting thicknesses as great as ten inches. In such cases, the judgment of a skilled operator may be relied upon to apply slightly less than the basic pressure, which remains good, however, for all the tips. Again, occasions may arise which require slightly different oxygen operating pressures because of varying quality of the metal being cut or the purity of the oxygen. Here again an off-standard pressure may be used, but its value will be determined by special conditions and will not be affected by the thickness of the material being cut or the power of the cutting tip.

It is not essential that each and every tip of a set have the restriction. For example, the largest tip of the set may have no restriction, if the diameter of its oxygen passage is such as to pass the proper amount of oxygen at the constant pressure.

It has been found that the restriction orifice has, in itself, a beneficial influence on the quality of the cut, although the reason for this is not fully understood.

I claim:

A cutting tip having an oxygen delivery orifice and a restricted oxygen inlet orifice, the relative sizes of said orifices being substantially in accordance with the formula:

$$A_r = \left(\left(\frac{4000 \pm 700}{P}\right) - 14\right) A_c^{1.66}$$

wherein $A_r$ is the cross-sectional area of the oxygen inlet orifice in square inches, $A_c$ is the cross-sectional area of the exit orifice in square inches, and $P$ is the absolute value in pounds per square inch of a selected operating pressure common to a set of tips of different powers.

GEORGE M. DEMING.